US011199990B2

(12) United States Patent
Armangau et al.

(10) Patent No.: US 11,199,990 B2
(45) Date of Patent: Dec. 14, 2021

(54) DATA REDUCTION REPORTING IN STORAGE SYSTEMS

(71) Applicant: EMC IP Holding Company LLC, Hopkinton, MA (US)

(72) Inventors: Philippe Armangau, Acton, MA (US); Ivan Bassov, Brookline, MA (US); John Didier, Westboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 16/179,305

(22) Filed: Nov. 2, 2018

(65) Prior Publication Data

US 2020/0142628 A1  May 7, 2020

(51) Int. Cl.
*G06F 7/00* (2006.01)
*G06F 3/06* (2006.01)

(52) U.S. Cl.
CPC ............ *G06F 3/0653* (2013.01); *G06F 3/065* (2013.01); *G06F 3/067* (2013.01); *G06F 3/0608* (2013.01)

(58) Field of Classification Search
CPC .... G06F 16/122; G06F 16/128; G06F 16/182; G06F 17/30156; G06F 17/30159; G06F 17/30088; G06F 17/30135
See application file for complete search history.

(56) References Cited

U.S. PATENT DOCUMENTS

| 6,829,617 | B2 * | 12/2004 | Sawdon | G06F 11/1435 |
| 6,959,310 | B2 * | 10/2005 | Eshel | G06F 16/10 |
| 7,111,014 | B2 * | 9/2006 | Sawdon | G06F 11/1435 |
| 7,409,511 | B2 * | 8/2008 | Edwards | G06F 16/10 |
| | | | | 711/161 |
| 7,502,801 | B2 * | 3/2009 | Sawdon | G06F 11/1435 |
| 7,587,431 | B1 * | 9/2009 | Rao | G06F 11/1471 |
| 7,818,299 | B1 * | 10/2010 | Federwisch | G06F 16/10 |
| | | | | 707/649 |
| 7,885,988 | B2 * | 2/2011 | Bashyam | H03M 7/30 |
| | | | | 707/972 |

(Continued)

FOREIGN PATENT DOCUMENTS

| KR | 20040080429 | * | 9/2004 |
| WO | WO2013/049339 A1 | * | 4/2013 |

*Primary Examiner* — Daniel A Kuddus
(74) *Attorney, Agent, or Firm* — Krishnendu Gupta; Lesley Leonessa (57) ABSTRACT

There is disclosed techniques for data reduction reporting in storage systems. For example in one embodiment, the techniques comprise update a counter denoting an amount of data reduction obtained when a data reduction feature associated with a data reduction requirement is enabled in the storage system when one or more allocation units in a storage system satisfy a data reduction requirement of the storage system. The techniques further comprise generating a snapshot of at least a portion of a file related to the said allocation units such that a first relationship exists when the snapshot is generated and a second relationship exists when the snapshot or the file is updated. The techniques also comprise determining a data reduction attributed to the data reduction feature based on an amount of data reduction denoted by the data reduction counter and an amount of sharing and/or unsharing of indirect blocks including mapping pointers in the relationship between the snapshot and the file.

18 Claims, 5 Drawing Sheets

(56) References Cited

U.S. PATENT DOCUMENTS

| | | | | |
|---|---|---|---|---|
| 7,925,858 B2* | 4/2011 | Rao | .................... | G06F 11/1458 |
| | | | | 711/170 |
| 8,190,850 B1* | 5/2012 | Davenport | .............. | G06F 16/10 |
| | | | | 711/202 |
| 8,442,952 B1* | 5/2013 | Armangau | .......... | G06F 16/1752 |
| | | | | 707/686 |
| 8,504,787 B1* | 8/2013 | Graves | ................ | G06F 11/3442 |
| | | | | 711/162 |
| 2003/0158834 A1* | 8/2003 | Sawdon | .................. | G06F 16/10 |
| 2003/0158861 A1* | 8/2003 | Sawdon | .............. | G06F 11/2097 |
| 2003/0158862 A1* | 8/2003 | Eshel | ...................... | G06F 16/10 |
| 2005/0246397 A1* | 11/2005 | Edwards | ................ | G06F 16/10 |
| 2006/0206536 A1* | 9/2006 | Sawdon | .............. | G06F 11/2097 |
| 2010/0077173 A1* | 3/2010 | Rao | .................... | G06F 11/1458 |
| | | | | 711/170 |
| 2012/0317464 A1* | 12/2012 | Yoshiyama | ............. | H04L 7/042 |
| | | | | 714/799 |
| 2012/0330903 A1* | 12/2012 | Periyagaram | ........... | G06F 3/067 |
| | | | | 707/692 |
| 2017/0180394 A1* | 6/2017 | Crofton | ................... | G06F 21/64 |
| 2019/0236163 A1* | 8/2019 | Bassov | ................. | G06F 3/0643 |
| 2019/0339911 A1* | 11/2019 | Bassov | .................. | G06F 3/065 |

* cited by examiner

DATA REDUCTION REPORTING IN STORAGE SYSTEMS

TECHNICAL FIELD

The present invention relates generally to data storage. More particularly, the present invention relates to data reduction reporting in storage systems.

BACKGROUND OF THE INVENTION

Some data storage systems employ data reduction techniques, such as compression, deduplication and/or pattern matching, to improve storage efficiency. As a result of such data reduction processing, the processed data requires less storage space than the original version of the data. A need exists for improved techniques for reporting the space savings that result from such data reduction techniques.

SUMMARY OF THE INVENTION

There is disclosed a method, comprising: when one or more allocation units in a storage system satisfy a data reduction requirement of the storage system, updating a data reduction counter denoting an amount of data reduction obtained when a data reduction feature associated with the data reduction requirement is enabled in the storage system; generating a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and determining a data reduction attributed to the data reduction feature based on an amount of data reduction denoted by the data reduction counter and an amount of sharing and/or unsharing in the relationship between the snapshot and the file.

There is also disclosed an apparatus, comprising: memory; and processing circuitry coupled to the memory, the memory storing instructions which, when executed by the processing circuitry, cause the processing circuitry to: when one or more allocation units in a storage system satisfy a data reduction requirement of the storage system, update a data reduction counter denoting an amount of data reduction obtained when a data reduction feature associated with the data reduction requirement is enabled in the storage system; generate a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and determine a data reduction attributed to the data reduction feature based on an amount of data reduction denoted by the data reduction counter and an amount of sharing and/or unsharing in the relationship between the snapshot and the file.

There is also disclosed a computer program product having a non-transitory computer readable medium which stores a set of instructions, the set of instructions, when carried out by processing circuitry, causing the processing circuitry to perform a method of: when one or more allocation units in a storage system satisfy a data reduction requirement of the storage system, updating a data reduction counter denoting an amount of data reduction obtained when a data reduction feature associated with the data reduction requirement is enabled in the storage system; generating a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and determining a data reduction attributed to the data reduction feature based on an amount of data reduction denoted by the data reduction counter and an amount of sharing and/or unsharing in the relationship between the snapshot and the file.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus and computer program product for reporting space savings due to data reduction in storage systems.

Data reduction is an efficiency feature that allows users to store information using less storage capacity than storage capacity used without data reduction. For example, data storage systems often employ data reduction techniques, such as data compression, deduplication and/or pattern matching, to improve storage efficiency. However, the benefit and effectiveness of these data reduction features cannot be assessed unless the space savings due to data reduction are reported. As a result, and in order to facilitate reporting, the storage systems maintain a number of counters and metrics relating to data reduction techniques such that data reduction can be reported separately and/or in combination.

The data reduction savings attributed to pattern matching can, therefore, be reported independently of the data reduction attributed to deduplication.

However, the challenge is to accurately report space savings due to data reduction techniques (ILC, ILPD and ILD) but exclude data reduction due to snap block sharing from savings reporting. That's because snaps are used for data protection regardless of their implementation efficiency. For example, if the primary had 100 pattern mapping pointers detected, that is considered as 100 blocks saved. Suppose a snap is then created and write split all 100 mapping pointers. The total counter is now 200. But it is not accurate to say that 200 blocks are saved due to pattern matching because if there was no pattern matching then 100 blocks would be saved due to snap creation. So, in reality, only 100 blocks are saved due to pattern matching (both before and after the write split), and the other 100 blocks are saved due to snap.

Previous approaches have addressed this issue by determining upper and lower bounds of savings and using an average of the two bounds for reporting. For example, and supposing data reduction relates to pattern matching, counters may be incremented either when pattern matching is detected or when there is a write split of a leaf indirect blocks in which case the counters are increased by the number of all pattern mapping pointers in the indirect block. The sum of the counters is then used as the upper bound of pattern saving because snap savings may contribute some pattern counters due to duplicated pattern mapping pointers (MPs) during write split. In the example in the previous paragraph, the upper bound is 200, and the lower bound is the upper bound divided by the number of total user files (nFiles), which equals to the number of primary and replica files. The average pattern saving is then used for reporting.

It should, however, be noted that the conventional approach described above has disadvantages. For example, with each additional snap created, the formula results in a further drop in savings. Suppose the formula is represented as follows:

ulong64 ilpdSaving=nPattern*(nFile+1)/nFile/2 ulong64 ildSaving=nDedup*(nFile+1)/nFile/2

If there are no snaps, then nFile=1 and the result is as follows:

ilpdSaving=nPattern*(nFile+1)/nFile/2=nPatterns*(1+1)/½=nPatterns;

ildSaving=nDedup*(nFile+1)/nFile/2=nDedup*(1+1)/½=nDedup;

That is, with nFile=1 (no snaps):

ilpdSaving=nPatterns ildSaving=nDedup

However, if one snap is created, nFile becomes 2 and the result is as follows:

ilpdSaving=nPatterns*¾ ildSaving=nDedup*¾

That is, ¾ of the original value.

As will be appreciated, the more snaps that are created, the greater the number of nFiles (i.e., the primary plus all the replicas), and consequently the more savings will drop. This drop in savings is undesirable as users don't expect savings to drop when snaps are created. Additionally, the estimated average pattern savings may be a rough estimate. This estimate may not be precise enough for some users.

By contrast, the disclosure herein describes techniques for improving space accounting and space savings reporting due to data reduction, for example, pattern matching and deduplication. The goal is to accurately report space savings due to data reduction techniques (ILC, ILPD and ILD) but exclude data reduction due to snap block sharing from savings reporting. That's because snaps are used for data protection regardless of their implementation efficiency.

Furthermore, in at least one embodiment, the savings can be used for selectively disabling specific data reduction methods based on certain thresholds. For example, if the numbers show there is little benefit (little savings) for performing pattern detection and/or deduplication, then we can stop performing pattern detection and/or deduplication to save processing power.

In at least one embodiment, the disclosure describes techniques of determining data reduction in connection with, for example, pattern matching and/or deduplication in a storage system, as follows:

ulong64
    ilpdSaving=nPattern*primaryMappedMetaData/
    familyAllocatedMetaData ulong64
    ildSaving=nDedup*primaryMappedMetaData/
    familyAllocatedMetaData whereby nPattern is a number of patterns detected (pattern mapping pointers)

whereby nDedup is a number of deduped blocks detected (deduplication mapping pointers)

whereby primaryMappedMetaData is a total number of indirect blocks that mapped to the primary file. It includes blocks uniquely owned by the primary and also blocks shared between the primary and the snaps, and whereby familyAllocatedMetaData is a total number of unique indirect blocks in the family (the primary and all snaps). This include all non-shared blocks and also shared blocks, but if the block is shared, it's counted only once.

As described above, nPattern and nDedup are respectively prorated to primaryMappedMetaData/familyAllocatedMetaData. It should be understood that both the primaryMappedMetaData and familyAllocatedMetaData will not change when a snapshot is created. Snap creation is an instantaneous operation which does not change the state of the storage objects. That is, the primary object remains unchanged, thus its mapped count remains the same, and also total family allocated remains unchanged when snapshot is created. Both primaryMappedMetaData and familyAllocatedMetaData only change when a leaf indirect block is split. Therefore, taking a snapshot won't affect space savings. In addition, the reported savings will reflect reality more closely.

In another embodiment, the disclosure describes techniques of determining data reduction in connection with, for example, pattern matching and/or deduplication in a storage system, as follows:

Suppose C is the existing counter, such as patternZeroMatched, patternNonZeroMatched or dedupMappingPointers, and that counter C herein is the same as nPattern in the earlier embodiment. Suppose C' is a new counter that includes only a subset of mapping pointers that are incremented during indirect block write split. In addition, suppose an S bit is set to all ILPD and ILD mapping pointers during write split, on both primary and secondary objects. That is:

1. C counter remains the same (separate counters for ILD or ILPD MPs).
2. S bit is set on indirect block write-split, in all ILD and ILPD MPs in that block, and on both primary and snap.
3. S bit is unset when overwriting or punching hole.
4. C' is incremented on indirect block write-split and decremented only if S bit is unset.
5. C' is not allowed to go below zero. If it reaches 0, it won't be decremented further.
6. Space savings reported is the difference between C-C'.

For example, suppose C represents the number of ILPD mapping pointers (the number of patterns matched) and there are no snaps. Suppose also that C=300 and C' is initially 0. Now suppose a snap is created and overwrites a few blocks on the primary. This overwrite will cause a write-split of a leave indirect block which address the overwritten data blocks. So, C becomes 600 and C' becomes 300. In addition 600 ILPD mapping pointers have an S-bit set (300 on the primary and 300 on the snap). Now, suppose the ILDP blocks are overwritten on both the primary and the snap. Each time such block is overwritten, S-bit gets unset and both C and C' are decremented. However, C' is not allow to go below 0. If 301 ILPD blocks are overwritten than C becomes 299 (i.e., 600-301=299) and C' stays at 0. So, at this point, the savings are 299 (i.e., C-C'=299−0=299 (blocks)).

Advantageously, the above approach determines savings accurately in the majority of cases. However, one corner case when C-C' may not be exact is when the same block offset is overwritten on all files (primary and snaps). In that particular case C-C' is still an upper bound but it's much closer to the reality than C alone. For example, suppose the primary file has 2 pattern matched blocks: X and Y. Thus, C=2 and C'=0 and the savings are C-C'=2, which is correct. Suppose that X and Y belong to the same indirect block so they are split together. Now suppose a snap is taken and overwritten on block X on primary and block Y on snap. This will result in C and C' becoming C=2 and C'=0 again. The savings remain C-C'=2 which is still reflecting the reality: block Y is saved on primary and block X is saved to snap, total 2 blocks are saved due to pattern matching. Now suppose that instead of blocks X and Y, only block X was overwritten on both primary and the snap. The counters would still be the same: C=2 and C'=0 and C-C'=2. However, the actual saving due to pattern matchings is 1 block because block Y on the snap would be saved due to snap block sharing even if there were no pattern matching. This corner case anomaly requires that the same ILD/ILPD block is overwritten on all the files in the family.

Described in following paragraphs are techniques that may be used in an embodiment in accordance with techniques herein for data reduction reporting in storage systems.

Figure 1:
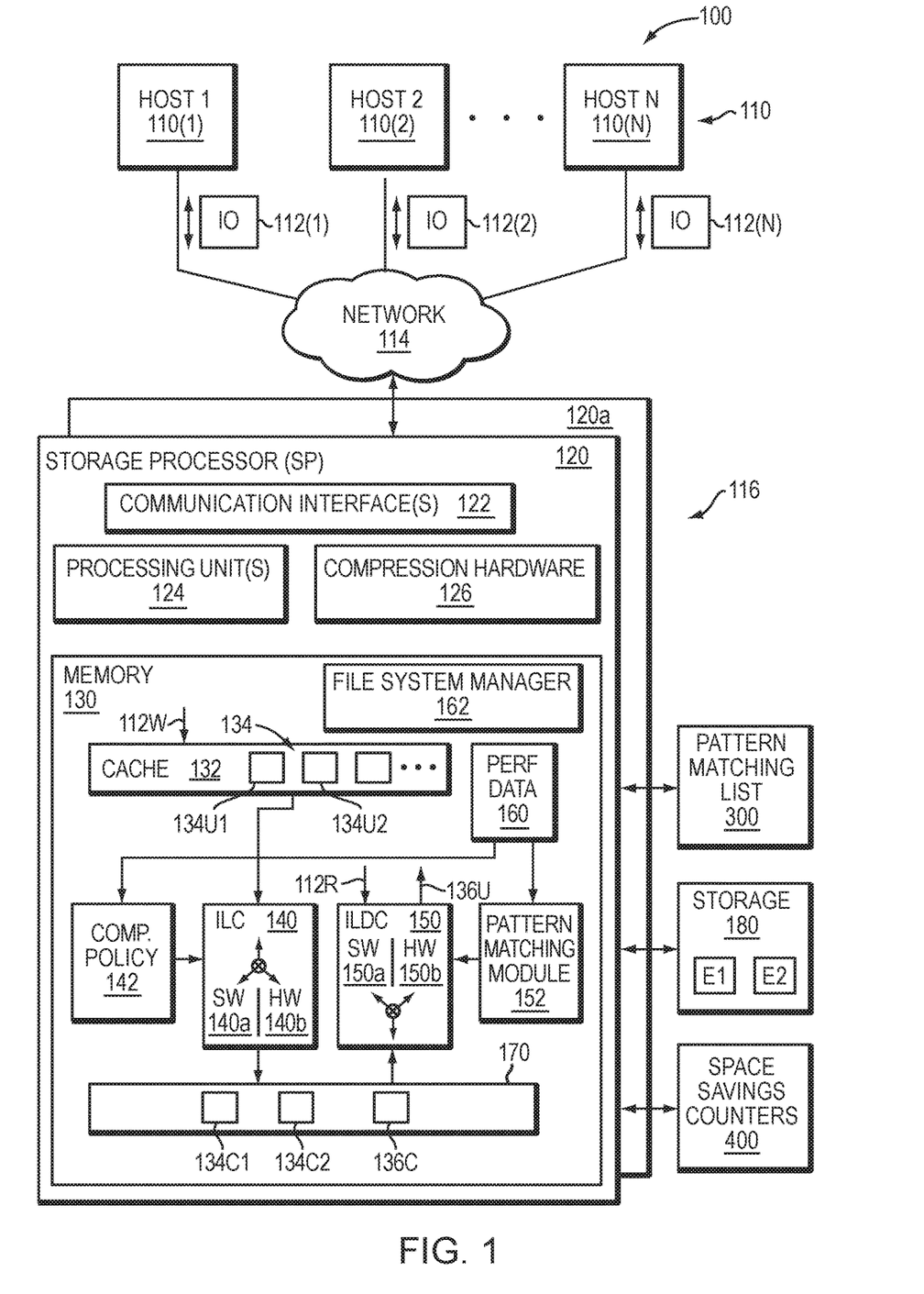
FIG. 1 is an example computer system that may be used in connection with one or more embodiments.

FIG. 1 depicts an example embodiment of a system that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In one example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," that plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems Interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, sub-assemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, an inline decompression (ILDC) engine 150, and a data object 170. A compression policy 142 provides control input to the ILC engine 140. A decompression policy (not shown) provides control input to the ILDC engine 150. Both the compression policy 142 and the decompression policy receive performance data 160, that describes a set of operating conditions in the data storage system 116.

In an example, the data object 170 is a host-accessible data object, such as a LUN, a file system, or a virtual machine disk (e.g., a VVol (Virtual Volume), available from VMWare, Inc. of Palo Alto, Calif.). The SP 120 exposes the data object 170 to hosts 110 for reading, writing, and/or other data operations. In one particular, non-limiting example, the SP 120 runs an internal file system and implements the data object 170 within a single file of that file system. In such an example, the SP 120 includes mapping (not shown) to convert read and write requests from hosts 110 (e.g., IO requests 112(1-N)) to corresponding reads and writes to the file in the internal file system.

As further shown in FIG. 1, ILC engine 140 includes a software component (SW) 140a and a hardware component (HW) 140b. The software component 140a includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140b includes software constructs, such as a driver and API (application programmer interface) for communicating with compression hardware 126, e.g., for directing data to be compressed by the compression hardware 126. In some examples, either or both components 140a and 140b support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For decompressing data, the ILDC engine 150 includes a software component (SW) 150a and a hardware component (HW) 150b. The software component 150a includes a decompression algorithm implemented using software instructions, which may be loaded in memory and executed by any of processing units 124 for decompressing data in software, without involvement of the compression hardware 126. The hardware component 150b includes software constructs, such as a driver and API for communicating with compression hardware 126, e.g., for directing data to be decompressed by the compression hardware 126. Either or both components 150a and 150b may support multiple decompression algorithms. In some examples, the ILC engine 140 and the ILDC engine 150 are provided together in a single set of software objects, rather than as separate objects, as shown.

In one example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112W, and others specify data reads 112R, for example. Cache 132 receives write requests 112W and stores data specified thereby in cache elements 134. In a non-limiting example, the cache 132 is arranged as a circular data log, with data elements 134 that are specified in newly-arriving write requests 112W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112W either to the software component 140a for performing software compression or to the hardware component 140b for performing hardware compression.

In an example, cache 132 flushes to the respective data objects, e.g., on a periodic basis. For example, cache 132 may flush a given uncompressed element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline," in one or more embodiments, because it is conducted in the course of processing the first write of the data to the data object 170.

Continuing to another write operation, cache 132 may proceed to flush a given element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at a high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

When SP 120 performs reads, the ILDC engine 150 selects between the software component 150*a* and the hardware component 150*b* based on input from the decompression policy and also based on compatible algorithms. For example, if data was compressed using a particular software algorithm for which no corresponding decompression algorithm is available in hardware, the ILDC engine 150 may steer the compressed data to the software component 150*a*, as that is the only component equipped with the algorithm needed for decompressing the data. However, if both components 150*a* and 150*b* provide the necessary algorithm, then selection among components 150*a* and 150*b* may be based on decompression policy.

To process a read request 112R directed to compressed data 136C, the ILDC engine 150 accesses metadata of the data object 170 to obtain a header for the compressed data 136C. The compression header specifies the particular algorithm that was used to compress the data 136C. The ILDC engine 150 may then check whether the algorithm is available to software component 150*a*, to hardware component 150*b*, or to both. If the algorithm is available only to one or the other of components 150*a* and 150*b*, the ILDC engine 150 directs the compressed data 136C to the component that has the necessary algorithm. However, if the algorithm is available to both components 150*a* and 150*b*, the ILDC engine 150 may select between components 150*a* and 150*b* based on input from the decompression policy. If the software component 150*a* is selected, the software component 150*a* performs the decompression, i.e., by executing software instructions on one or more of the set of processors 124. If the hardware component 150*b* is selected, the hardware component 150*b* directs the compression hardware 126 to decompress the data 136C. The SP 120 then returns the resulting uncompressed data 136U to the requesting host 110.

It should be appreciated that the ILDC engine 150 is not required to use software component 150*a* to decompress data that was compressed by the software component 140*a* of the ILC engine 140. Nor is it required that the ILDC engine 150 use hardware component 150*b* to decompress data that was compressed by the hardware component 140*b*. Rather, the component 150*a* or 150*b* may be selected flexibly as long as algorithms are compatible. Such flexibility may be especially useful in cases of data migration. For example, consider a case where data object 170 is migrated to a second data storage system (not shown). If the second data storage system does not include compression hardware 126, then any data compressed using hardware on data storage system 116 may be decompressed on the second data storage system using software.

With the arrangement of FIG. 1, the SP 120 intelligently directs compression and other data reduction tasks to software or to hardware based on operating conditions in the data storage system 116. For example, if the set of processing units 124 are already busy but the compression hardware 126 is not, the compression policy 142 can direct more compression tasks to hardware component 140*b*. Conversely, if compression hardware 126 is busy but the set of processing units 124 are not, the compression policy 142 can direct more compression tasks to software component 140*a*. Decompression policy may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN may be used to refer to the foregoing logically defined devices or volumes.

The data storage system may be a single unitary data storage system, such as single data storage array, including two storage processors or compute processing units. Techniques herein may be more generally used in connection with any one or more data storage systems each including a different number of storage processors than as illustrated herein. The data storage system 116 may be a data storage array, such as a Unity™, a VNX™ or VNXe™ data storage array by Dell EMC of Hopkinton, Mass., including a plurality of data storage devices 116 and at least two storage processors 120*a*. Additionally, the two storage processors 120*a* may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs (File System Block Number) and is configured to store blocks containing file data. In addition, a range includes file system metadata, such as inodes, indirect blocks (IBs), and virtual block maps (VBMs), for example, as discussed further below in conjunction with FIG. 2. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges as described above herein apply to the lowest level of the tree, the term "ranges" as used herein may refer to groupings of contiguous blocks at any level.

In at least one embodiment of the technique, hosts 110 (1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed, e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

As shown in FIG. 1, the data storage system 116 further comprises a pattern matching module 152 that implements the techniques described herein. The exemplary pattern matching module 152 compares a given allocation unit to a pattern matching list 300 identifying one or more predefined patterns, such as an all-zero pattern. In addition, when a given allocation unit matches one or more predefined patterns, at least one pattern flag is set in the mapping pointer of the allocation unit, and one or more pattern counters 400 are incremented in a super block (SB) or other file system metadata.

In at least one embodiment, the exemplary predefined pattern matching list 300 comprises at least two representative patterns, for example, all-zeroes and all-ones. In one or more embodiments, the representative patterns have an assigned pattern number identifier. Additional patterns can be added to the exemplary predefined pattern matching list 300, as would be apparent to a person of ordinary skill in the art. As noted above, the exemplary pattern matching module 152 implements the techniques described herein, and compares a given allocation unit to the predefined patterns specified in the pattern matching list 300, such as the all-zero pattern.

In another embodiment, the exemplary space savings counters 400 comprise a first counter 410 that tracks the number of allocation units having an all-zero pattern, and a second counter 420 that tracks the number of allocation units having all other predefined patterns from the exemplary predefined pattern matching list 300. In one or more embodiments, one or more of the exemplary space savings counters 400 are incremented when a given allocation unit matches one or more predefined patterns. In some embodiments, exemplary space savings counters 400 are maintained on-disk by the space saving module 152, for example, in the super block (SB) or other file system metadata.

Additionally, in at least one embodiment, and although not shown in the figure, the data storage system 116 may comprise a deduplication engine and a space savings accounting module that implement the techniques described herein. The deduplication engine may perform deduplication by determining if a first allocation unit of data in the storage system matches a second allocation unit of data. When a match is found, a leaf pointer for the first allocation unit is replaced with a deduplication pointer to the leaf pointer of the second allocation unit, and one or more space savings counters are incremented, for example, by the space savings accounting module. For example, in one embodiment, the deduplication engine 150 may perform deduplication by determining if a first allocation unit of data in the storage system matches a second allocation unit of data by comparing SHA (Secure Hash Algorithm) hash values of the allocation units. It should be understood that this is only one approach to deduplication. For example, in other embodiments, the deduplication MP may point to a VBM extent directly as will be explained further below.

For additional details, see, for example, U.S. patent application Ser. No. 15/393,331, filed Dec. 29, 2016, entitled "Managing Inline Data Compression in Storage Systems," U.S. patent application Ser. No. 15/664,253, filed Jul. 31, 2017, entitled "Data Reduction Reporting in Storage Systems," U.S. patent application Ser. No. 16/054,216, filed Aug. 3, 2018, entitled "Method, Apparatus and Computer Program Product for Managing Data Storage," U.S. patent application Ser. No. 16/054,301, filed Aug. 3, 2018, entitled "Method, Apparatus and Computer Program Product for Managing Data Storage," all of which are incorporated by reference herein in their entirety.

Figure 2:
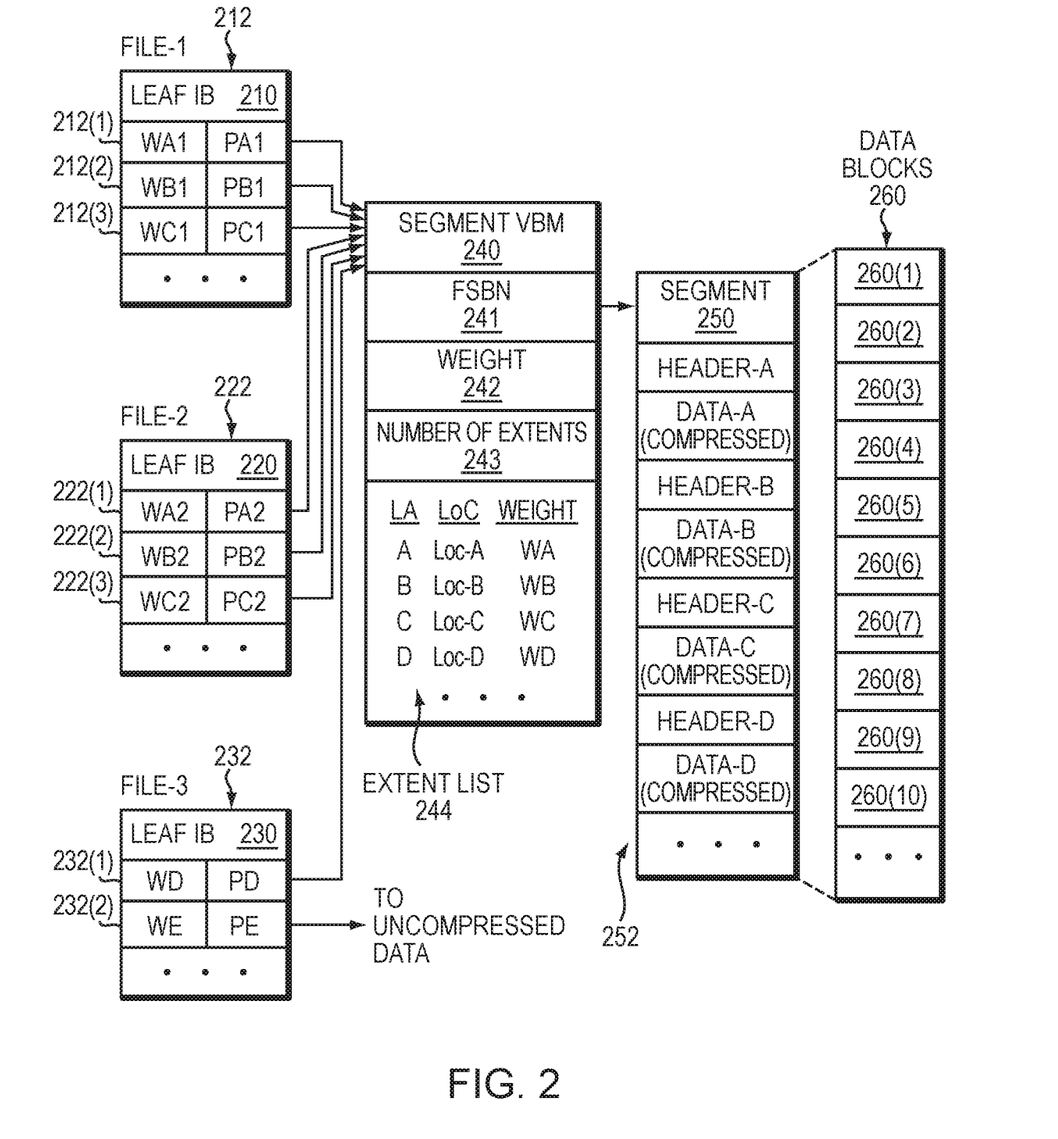
FIG. 2 illustrates in further detail components that may be used in connection with one or more embodiments.

Referring now to FIG. 2, shown is a more detailed representation of components that may be included in an embodiment using the techniques herein. As shown in FIG. 2, a segment 250 that stores data of a file system is composed from multiple data blocks 260. Here, exemplary segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260 (10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Location values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), also referred to herein as a mapping pointer, which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

$WA=WA1+WA2;$ $WB=WB1+WB2;$ $WC=WC1+WC2;$

WD=WD; and

Weight 242=$\Sigma Wi$ (for $i=a$ through $d$, plus any additional extents 252 tracked by extent list 244).

The detail shown in segment 450 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC 150 to decompress the compressed data using the specified algorithm.

In at least one embodiment of the current technique, for example, upon receiving a request to overwrite and/or update data of data block (Data-D) pointed to by block pointer 232($a$), a determination is made as to whether the data block (Data-D) has been shared among any other file. Further, a determination is made as to whether the size of the compressed extent (also referred to herein as "allocation unit") storing contents of Data-D in segment 250 can accommodate the updated data. Based on the determination, the updated data is written in a compressed format to the compressed extent for Data-D in the segment 250 instead of allocating another allocation unit in a new segment.

Figure 3:
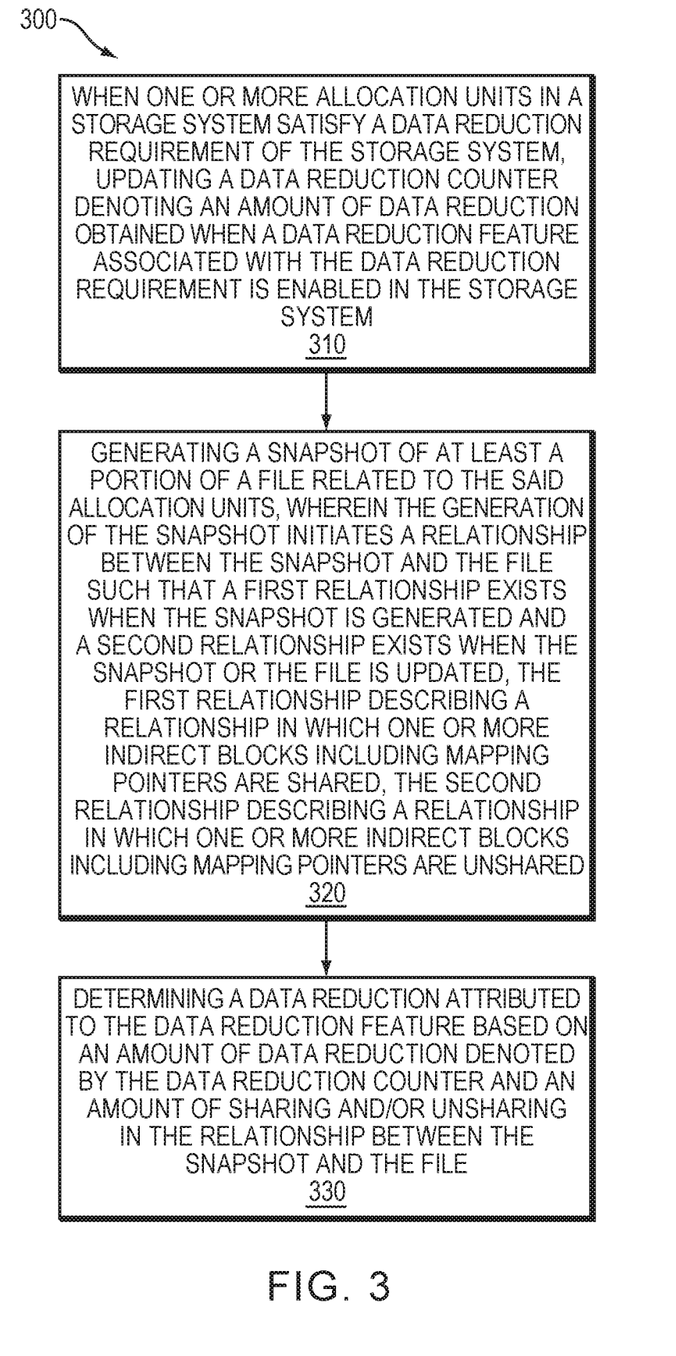
FIG. 3 is a flowchart depicting an example method of data reduction reporting in storage systems in connection with one or more embodiments.

FIG. 3 shows an example method 300 that may be carried out in connection with the system 100. The method 300 typically performed, for example, by the software constructs described in connection with FIG. 1, which reside in the memory 130 of the storage processor 120 and are run by the processing unit(s) 124. The various acts of method 300 may be ordered in any suitable way. Accordingly, embodiments may be constructed in which acts are performed in orders different from that illustrated, which may include performing some acts simultaneously.

At step 310, when one or more allocation units in a storage system satisfy a data reduction requirement of the storage system, updating a data reduction counter denoting an amount of data reduction obtained when a data reduction feature associated with the data reduction requirement is enabled in the storage system. At step 320, generating a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared. At step 330, determining a data reduction attributed to the data reduction feature based on an amount of data reduction denoted by the data reduction counter and an amount of sharing and/or unsharing in the relationship between the snapshot and the file.

One or more embodiments of the disclosure provide methods and apparatus and computer program products for reporting space savings. In one or more embodiments, space savings reporting techniques are provided that improve the accuracy of the space savings reporting attributable to data reduction feature(s) (e.g., pattern matching, deduplication, etc.).

The foregoing applications and associated embodiments should be considered as illustrative only, and numerous other embodiments can be configured using the techniques disclosed herein, in a wide variety of different applications.

It should also be understood that the disclosed techniques for reporting space savings, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for space savings reporting may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data storage system 116, or portions thereof, are illustratively implemented for use by tenants of such a multi-tenant environment.

Cloud infrastructure as disclosed herein can include cloud-based systems such as AWS, GCP and Microsoft Azure™. Virtual machines provided in such systems can be used to implement at least portions of data storage system 116 in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the space saving reporting devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
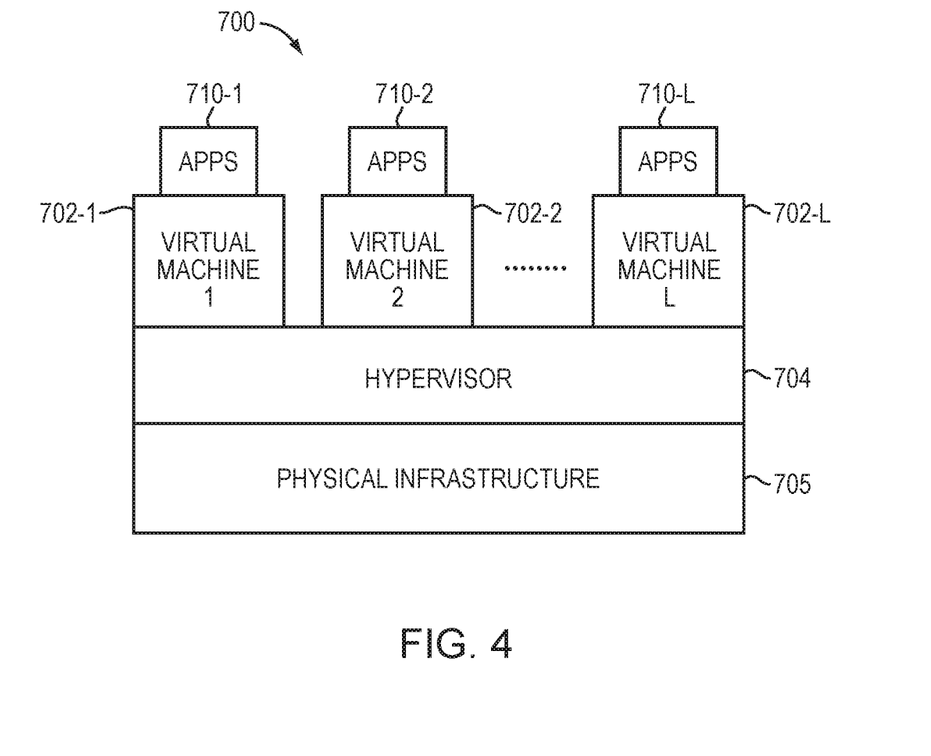
FIG. 4 illustrates an exemplary processing platform that may be used to implement at least a portion of one or more embodiments comprising a cloud infrastructure.

Referring now to FIG. 4, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 4, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed space saving reporting systems may each run on a computer, server, storage device or other processing platform element. A given such element may be viewed as an example of what is more generally referred to herein as a "processing device." The cloud infrastructure 700 shown in FIG. 4 may represent at least a portion of one processing platform.

Figure 5:
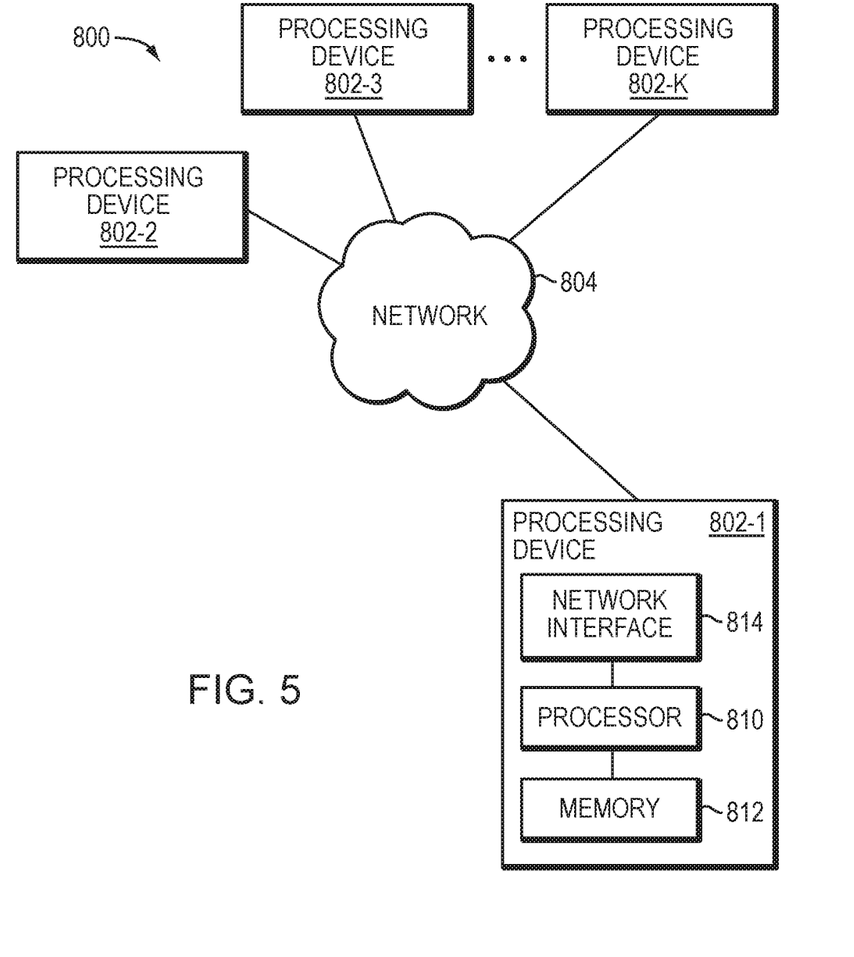
FIG. 5 illustrates another exemplary processing platform that may be used to implement at least a portion of one or more embodiments.

Another example of a processing platform is processing platform 800 shown in FIG. 5. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device.

It should again be emphasized that the above-described embodiments are presented for purposes of illustration only. Many variations and other alternative embodiments may be used. For example, the disclosed techniques are applicable to a wide variety of other types of information processing systems, compute services platforms, and space savings reporting platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   when one or more allocation units in a storage system employ data reduction of the storage system, updating a data reduction counter denoting an amount of data reduction obtained when a data reduction feature associated with the data reduction is employed in the storage system;
   generating a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and
   determining the data reduction attributed to the data reduction feature based on an amount of data reduction denoted by the data reduction counter and an amount of sharing and unsharing in the relationship between the snapshot and the file, wherein the data reduction includes a write-split value, comprising a subset of mapping pointers that are incremented during indirect block write split, and wherein, to accurately determine the data reduction, the space saving due to snap block sharing is excluded by deducting the write-split value when determining the data reduction.

2. The method as claimed in claim 1, wherein the data reduction counter includes a data reduction count that denotes an amount of data reduction obtained when the data reduction feature is employed in the storage system; and
   wherein determining the data reduction attributed to the data reduction feature, comprises:
   determining the data reduction count of the data reduction counter;
   based on the relationship between the file and the snapshot, determining a value representing a proportion of indirect blocks associated with the file relative to indirect blocks associated with the file and the snapshot; and
   multiplying the data reduction count and the value to determine the data reduction attributed to the data reduction feature.

3. The method as claimed in claim 1, further comprising:
receiving an operation to update the file or the snapshot in the storage system; and
in response to receiving the operation, transitioning the relationship between the snapshot and the file from the first relationship in which one or more indirect blocks including mapping pointers are shared to the second relationship in which one or more of the indirect blocks including mapping pointers are unshared by the snapshot and the file.

4. The method as claimed in claim 3, wherein the data reduction counter includes a data reduction count that denotes an amount of data reduction obtained when the data reduction feature is employed in the storage system; and
wherein determining the data reduction attributed to the data reduction feature, comprises:
determining the data reduction count of the data reduction counter;
determining the write-split value representing an increase in the data reduction count resulting from the transition of the first relationship to the second relationship; and
subtracting the write-split value from the data reduction count to determine the data reduction attributed to the data reduction feature.

5. The method as claimed in claim 4, wherein the data reduction count represents a number of mapping pointers disposed in the respective indirect blocks that are affected by the data reduction feature; and
wherein determining the data reduction attributed to the data reduction feature, comprises:
receiving an update operation in connection with the file or the snapshot;
in response to receiving the said update operation, updating the data reduction count and the write-split value based on the type of the update operation, wherein the data reduction count and the write-split value are either incremented or decremented and the write-split value cannot be decremented below zero; and
subtracting the updated value from the updated data reduction count to determine the data reduction attributed to the data reduction feature.

6. The method as claimed in claim 1, wherein the data reduction feature associated with the data reduction relates to one or more of pattern matching and deduplication.

7. An apparatus, comprising:
memory; and
processing circuitry coupled to the memory, the memory storing instructions which, when executed by the processing circuitry, cause the processing circuitry to:
when one or more allocation units in a storage system a employ data reduction of the storage system, update a data reduction counter denoting an amount of data reduction obtained when a data reduction feature associated with the data reduction is employed in the storage system;
generate a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and
determine the data reduction attributed to the data reduction feature based on an amount of data reduction denoted by the data reduction counter and an amount of sharing and/or unsharing in the relationship between the snapshot and the file, wherein the data reduction includes a write-split value, comprising a subset of mapping pointers that are incremented during indirect block write split, and wherein, to accurately determine the data reduction, the space saving due to snap block sharing is excluded by deducting the write-split value when determining the data reduction.

8. The apparatus as claimed in claim 7, wherein the data reduction counter includes a data reduction count that denotes an amount of data reduction obtained when the data reduction feature is employed in the storage system; and
wherein determining the data reduction attributed to the data reduction feature, comprises:
determining the data reduction count of the data reduction counter;
based on the relationship between the file and the snapshot, determining a value representing a proportion of indirect blocks associated with the file relative to indirect blocks associated with the file and the snapshot; and
multiplying the data reduction count and the value to determine the data reduction attributed to the data reduction feature.

9. The apparatus as claimed in claim 7, further comprising:
receiving an operation to update the file or the snapshot in the storage system; and
in response to receiving the operation, transitioning the relationship between the snapshot and the file from the first relationship in which one or more indirect blocks including mapping pointers are shared to the second relationship in which one or more of the indirect blocks including mapping pointers are unshared by the snapshot and the file.

10. The apparatus as claimed in claim 9, wherein the data reduction counter includes a data reduction count that denotes an amount of data reduction obtained when the data reduction feature is employed in the storage system; and
wherein determining the data reduction attributed to the data reduction feature, comprises:
determining the data reduction count of the data reduction counter;
determining the write-split value representing an increase in the data reduction count resulting from the transition of the first relationship to the second relationship; and
subtracting the write-split value from the data reduction count to determine the data reduction attributed to the data reduction feature.

11. The apparatus as claimed in claim 10, wherein the data reduction count represents a number of mapping pointers disposed in the respective indirect blocks that are affected by the data reduction feature; and
wherein determining the data reduction attributed to the data reduction feature, comprises:
receiving an update operation in connection with the file or the snapshot;
in response to receiving the said update operation, updating the data reduction count and the write-split value based on the type of the update operation, wherein the data reduction count and the write-split value are either incremented or decremented and the write-split value cannot be decremented below zero; and subtracting the updated value from the updated data reduction count to determine the data reduction attributed to the data reduction feature.

12. The apparatus as claimed in claim 7, wherein the data reduction feature associated with the data reduction relates to one or more of pattern matching and deduplication.

13. A computer program product having a non-transitory computer readable medium which stores a set of instructions, the set of instructions, when carried out by processing circuitry, causing the processing circuitry to perform a method of:

when one or more allocation units in a storage system employ data reduction of the storage system, updating a data reduction counter denoting an amount of data reduction obtained when a data reduction feature associated with the data reduction is employed in the storage system;

generating a snapshot of at least a portion of a file related to the said allocation units, wherein the generation of the snapshot initiates a relationship between the snapshot and the file such that a first relationship exists when the snapshot is generated and a second relationship exists when the snapshot or the file is updated, the first relationship describing a relationship in which one or more indirect blocks including mapping pointers are shared, the second relationship describing a relationship in which one or more indirect blocks including mapping pointers are unshared; and determining the data reduction attributed to the data reduction feature based on an amount of data reduction denoted by the data reduction counter and an amount of sharing and/or unsharing in the relationship between the snapshot and the file, wherein the data reduction includes a write-split value, comprising a subset of mapping pointers that are incremented during indirect block write split, and wherein, to accurately determine the data reduction, the space saving due to snap block sharing is excluded by deducting the write-split value when determining the data reduction.

14. The computer program product as claimed in claim 13, wherein the data reduction counter includes a data reduction count that denotes an amount of data reduction obtained when the data reduction feature is employed in the storage system; and wherein determining the data reduction attributed to the data reduction feature, comprises:
determining the data reduction count of the data reduction counter;
based on the relationship between the file and the snapshot, determining a value representing a proportion of indirect blocks associated with the file relative to indirect blocks associated with the file and the snapshot; and multiplying the data reduction count and the value to determine the data reduction attributed to the data reduction feature.

15. The computer program product as claimed in claim 13, further comprising:
receiving an operation to update the file or the snapshot in the storage system; and
in response to receiving the operation, transitioning the relationship between the snapshot and the file from the first relationship in which one or more indirect blocks including mapping pointers are shared to the second relationship in which one or more of the indirect blocks including mapping pointers are unshared by the snapshot and the file.

16. The computer program product as claimed in claim 15, wherein the data reduction counter includes a data reduction count that denotes an amount of data reduction obtained when the data reduction feature is employed in the storage system; and wherein determining the data reduction attributed to the data reduction feature, comprises:
determining the data reduction count of the data reduction counter;
determining the write-split value representing an increase in the data reduction count resulting from the transition of the first relationship to the second relationship; and
subtracting the write-split value from the data reduction count to determine the data reduction attributed to the data reduction feature.

17. The computer program product as claimed in claim 16, wherein the data reduction count represents a number of mapping pointers disposed in the respective indirect blocks that are affected by the data reduction feature; and wherein determining the data reduction attributed to the data reduction feature, comprises:
receiving an update operation in connection with the file or the snapshot;
in response to receiving the said update operation, updating the data reduction count and the write-split value based on the type of the update operation, wherein the data reduction count and the write-split value are either incremented or decremented and the write-split value cannot be decremented below zero; and
subtracting the updated value from the updated data reduction count to determine the data reduction attributed to the data reduction feature.

18. The computer program product as claimed in claim 13, wherein the data reduction feature associated with the data reduction relates to one or more of pattern matching and deduplication.

* * * * *